(12) United States Patent
Miller et al.

(10) Patent No.: US 10,275,140 B1
(45) Date of Patent: Apr. 30, 2019

(54) SYSTEM AND METHOD FOR ORGANIZING AND DISPLAYING SELECTED INFORMATION IN TEMPORAL AND LOCATIONAL CONTEXT

(71) Applicants: Charles Q. Miller, Medfield, MA (US); Allen D. Bierbaum, Ames, IA (US); Aron L. Bierbaum, Ames, IA (US)

(72) Inventors: Charles Q. Miller, Medfield, MA (US); Allen D. Bierbaum, Ames, IA (US); Aron L. Bierbaum, Ames, IA (US)

(73) Assignee: PRIORITY 5 HOLDINGS, INC., Needham, MA (US)

( * ) Notice: Subject to any disclaimer, the term of this patent is extended or adjusted under 35 U.S.C. 154(b) by 656 days.

(21) Appl. No.: 14/869,216

(22) Filed: Sep. 29, 2015

Related U.S. Application Data

(60) Provisional application No. 62/056,796, filed on Sep. 29, 2014.

(51) Int. Cl.
*G06F 17/00* (2006.01)
*G06F 17/30* (2006.01)
*G06F 3/0484* (2013.01)
*G06F 3/0481* (2013.01)
*G06F 3/0482* (2013.01)

(52) U.S. Cl.
CPC ........ *G06F 3/04847* (2013.01); *G06F 3/0482* (2013.01); *G06F 3/04817* (2013.01); *G06F 17/30064* (2013.01)

(58) Field of Classification Search
CPC .......... G06F 17/3087; G06F 17/30654; G06F 17/30684; G06F 17/30241
See application file for complete search history.

(56) References Cited

U.S. PATENT DOCUMENTS

| 2010/0104174 A1* | 4/2010 | Rohlf | G06F 17/30241 382/154 |
| 2013/0111348 A1* | 5/2013 | Gruber | G06F 17/3087 715/727 |
| 2013/0185081 A1* | 7/2013 | Cheyer | G06F 17/3087 704/275 |

* cited by examiner

*Primary Examiner* — Cheryl Lewis
(74) *Attorney, Agent, or Firm* — Burns & Levinson LLP; Orlando Lopez

(57) ABSTRACT

A system and method for organizing and representing in a single display, using temporal and locational relationships, multiple selected pieces of information that may exist in different embodiments and that may be related to one or more past, present or future events.

19 Claims, 13 Drawing Sheets

SYSTEM AND METHOD FOR ORGANIZING AND DISPLAYING SELECTED INFORMATION IN TEMPORAL AND LOCATIONAL CONTEXT

CROSS REFERENCE TO RELATED APPLICATIONS

This application claims priority to and benefit of U.S. Provisional Application No. 62/056,796, entitled SYSTEM AND METHOD FOR ORGANIZING AND DISPLAYING SELECTED INFORMATION IN TEMPORAL AND LOCATIONAL CONTEXT, filed Sep. 29, 2014, which is incorporated by reference herein in its entirety and for all purposes.

BACKGROUND

These teachings relate generally to systems and methods for organizing and representing, in a visual display, using temporal and locational relationships, multiple selected pieces of information that may exist in different embodiments and that may be related to one or more past, present or future events.

A need exists in different settings (including but not limited to operations centers, intelligence centers, court rooms and investigative offices) to rapidly and coherently organize and display, in geospatial and temporal contexts, multiple selected pieces of information that may be relevant to one or more past, present or future events so as to enable an individual analyzing the data to perceive or infer relationships or attain better comprehension of the significance of the information in light of actual, anticipated or possible events.

SUMMARY

These teachings include a system and method that, in one embodiment, would be implemented by a computer or a network of computers using the Touch Assisted Command and Control System (TACCS™), a computer software program developed by Priority 5 Holdings, Inc. (see patent application Ser. No. 12/208,738), to manage and manipulate information obtained from one or more sources and using, when available, relevant temporal and geospatial information. The system and method of these teachings are generally described below, but may be varied slightly to enable these teachings to be more efficiently implemented based on available technology or programming practices.

In one embodiment, these teachings include a component of the TACCS™ software, and present as a feature to be enabled as part of an identified function of TACCS™. The feature is referred to herein, and is referred to in current descriptions of TACCS™ in the marketplace, as the TACCS™ Event File Manager (different terminology may be used from time to time hereafter in the marketplace to refer to such identified function). TACCS™ Event File Manager enables multiple pieces of information that have been selected, using automated processes, human judgment or both, as possibly relating to one or more past, present or future events or other circumstances of interest to be associated in a single container (referred to herein as a designated TACCS™ software Event File) and managed as a single entity in the TACCS™ software (container in the context of these teachings being any manner by which different pieces of information contained in separate electronic files may be associated so they can be managed as a single entity, including associating such different pieces of information contained in separate electronic files in one or more identified sub-files of a designated TACCS™ software Event File). All pieces of information so selected as being possibly related to a possible past, present or future event, which materials may consist of primary source materials or other materials embodied in electronic files of a format recognized by the TACCS™ Event File Manager, may be aggregated into one or more identified sub-files of a designated TACCS™ software Event File within the TACCS™ Event File Manager to be presented and analyzed. For instance, such primary source materials or other materials may be already existing in the TACCS™ software database or elsewhere in the TACCS™ software; other sources of such materials may be other databases available to the TACCS™ software; still other sources of such materials may be data feeds that are delivering information to the TACCS™ software in real time or near real time, such as alerts and incidents that are delivered by data feeds integrated into the TACCS™ software; and still other sources may be verbal or written reports that are made to a recorder and transformed into alerts or incidents in the TACCS™ software by the recorder.

In one embodiment, in the process of entering, into the TACCS™ software in the form of an electronic file, each of the materials selected as being possibly relevant to at least one past, present or future event, it may be necessary to assign to the electronic file a begin time, an end time or both (if the material in question does not already have such a time associated with it), and a location (if the primary source material in question does not already have a relevant location associated with it), which may be a point or an area, such times and location being assigned by using metatags associated with the electronic file containing such material. If a particular embodiment of such material were not in an embodiment that may be directly filed in the TACCS™ software, it must be made available to the TACCS™ software in a different embodiment. For instance, if an email were not able to be filed in the TACCS™ software database as an email, it would have to be embodied as a TACCS™ alert or as an image of the print version of the email. As a TACCS™ alert, the content of the email may be summarized in the body of the alert form, and an image of the email or a text file of the email attached. Alternatively, an image of the printed email may be directly entered into the TACCS™ software database, with appropriate times and location assigned to it.

In the above embodiment, all of the primary source materials and other materials having been associated with the appropriate identified sub-file and designated TACCS™ software Event File, the temporal viewing module of the TACCS™ Event File Manager may be engaged, said temporal viewing module to display a graphical user interface component that includes a timeline component and a slider component.

In the above embodiment, upon engagement with the at least one sub-file of a designated TACCS™ software Event File, the timeline component will display a start time and date and an end time and date, such dates being automatically provided from the earliest start date and latest end date of the electronic files associated with the selected sub-file of said designated TACCS™ software Event File, and will also display a range of shadings of a color (e.g., green) varying in intensity with the number of electronic files associated with said sub-file over the range of times and dates within the timeline component.

In the above embodiment, the slider component, which may be represented as a shape located on a horizontal timeline component, may be configured to represent an interval of time, which interval may vary in length depending upon the configuration (for example, the left-hand border of the shape may be configured to identify the date and time from which the interval is to be determined, and the right-hand border configured to bound the desired interval, such as one minute, one hour, one day, and so on); and the shape may be further configured to be moved backward and forward in time across the timeline component.

In the above embodiment, at each point in time falling within the interval of time represented by the slider component, the method of these teachings will cause to be displayed, at a location on the display, each icon representing an electronic file associated with the engaged sub-file, each icon to be at the location associated with the electronic file it represents and each icon to appear on the display during the period of time any portion of which is contained within the interval represented by the start and end times associated with such electronic file and any portion of which is included also in the interval of time represented by the slider component, said electronic file being the embodiment of a specific primary source material or other material, upon the selection of which a pop-up will appear showing on the display such primary source or other material.

In the above embodiment, the movement of the slider component will also cause the designated TACCS™ software Event File to identify, from a list that is part of the display and that contains a description of the electronic files associated with an engaged sub-file, each electronic file associated with an engaged sub-file and also associated with the period of time represented by the slider component, such that even though there may be no location associated with such electronic file (and therefore no icon appearing at an associated location on the display) the electronic file is so identified, upon the selection of which a pop-up will appear showing on the display such primary source or other material.

In the above embodiment, the system of these teachings includes one or more processors and one or more computer usable media having computer readable code embodied therein, which when executed in the one or more processors causes the one or more processors to perform the method of these teachings. These teachings as described may be implemented in the computer processing environment created by the Touch Assisted Command and Control System (TACCS™), a computer software program developed by Priority 5 Holdings, Inc. (see patent application Ser. No. 12/208,738); but the system and method, with appropriate adaptations, may also be implemented in other computer processing environments and by other means, including other software.

For a better understanding of the present teachings, together with other and further objects thereof, reference is made to the accompanying drawings and detailed description, and its scope will be pointed out in the appended claims.

DETAILED DESCRIPTION

Figure 1:
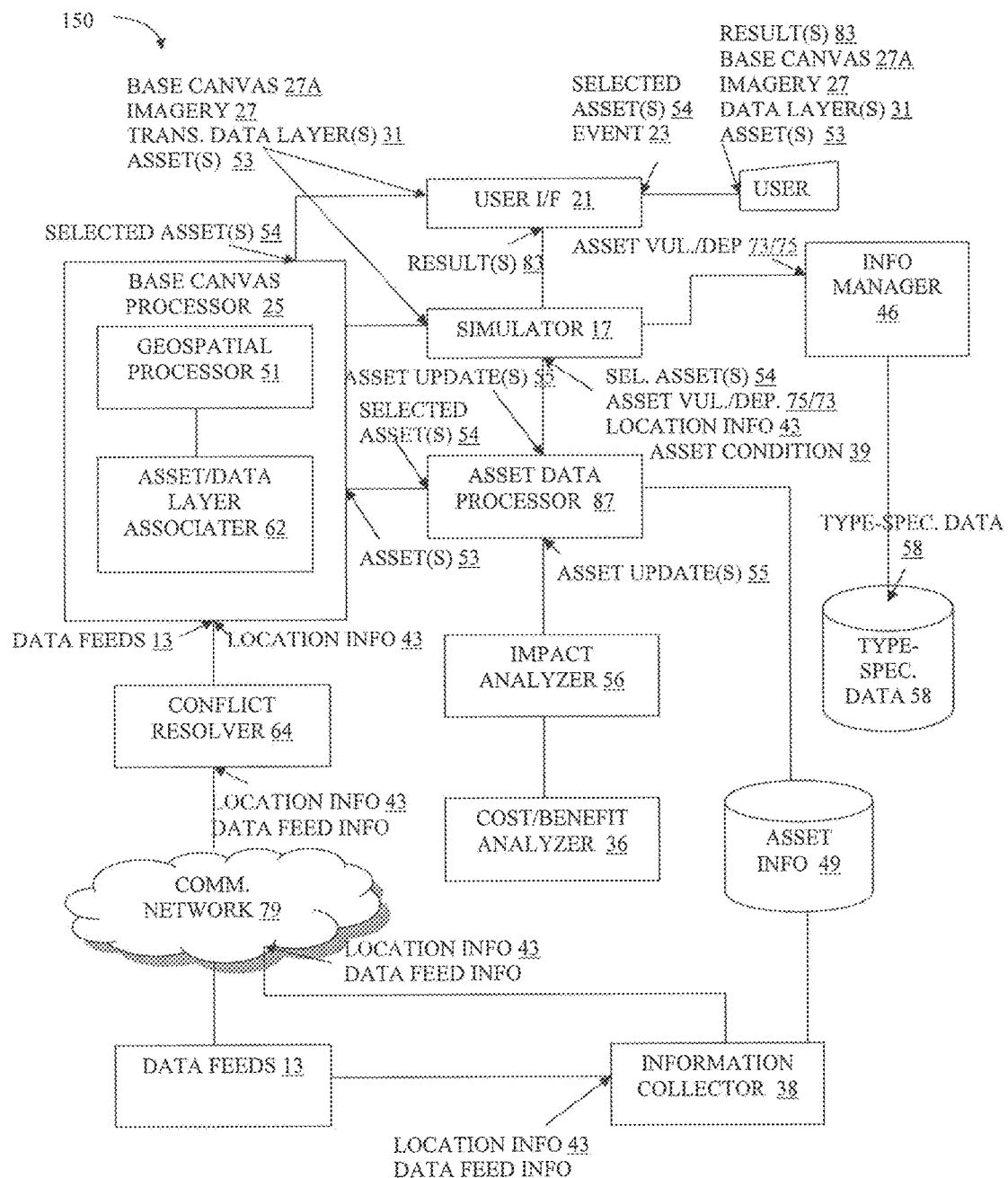
FIG. 1 is a schematic block diagram of the components of the event system of the present embodiment.

The following is a detailed description of the best currently contemplated mode of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Source material, as used herein, refers to a primary source material or other material. Primary source materials include pictures, images, reports of first-hand witnesses, live camera feeds, live alarm feeds and other materials from the time period involved that have not been filtered through interpretation or evaluation. Other materials are materials that are not primary source materials.

A graphical user interface component as used herein is a graphically expressed component that provides input to a computer readable code, embodied in a computer usable medium, where the computer readable code, upon receiving the input, causes a processor, upon executing the computer readable code, to perform predetermined actions. Examples of graphical user interface components are icons, scroll bars, and drop-down menus.

Methods and systems that enable rapidly and coherently organizing and displaying, in geospatial and temporal contexts, multiple selected pieces of information that have been selected, using automated processes, human judgment or both, as possibly relating to one or more past, present or future events so as to enable an individual analyzing the data to perceive or infer relationships or attain better comprehension of the significance of the information in light of actual, anticipated or possible events are presented herein below.

One manner by which such a visual display may be created, using the system and method of these teachings, is to utilize one or more electronic embodiments of information so selected, and, using a computer and software of the nature described herein, arrange such electronic embodiments and visually display such information in temporal and geospatial context.

Examples of different types of information and the different electronic embodiments of such information may include, but are not limited to, alerts (which may be embodied electronically in the Common Alert Protocol format), incidents (which may be embodied in the electronic file format used by the Touch Assisted Command and Control System referred to below), images (which may be embodied in a rastor, vector—2D or 3D, compound or other electronic file format such as .jpeg, .tiff, .rif, .gif, .png, .pdf, .xaml, .xmp, .exif, .cgm or .dng), videos (which may be embodied in different electronic container formats, including Matroska, .avi, Flash Video, MPEG-4 Part 12 or .mov, that include video coding formats and may include audio coding formats), sound recordings (which may be embodied in a variety of electronic file formats that include compressed or uncompressed files), alarms from sensor systems, documents in editable formats (which may be embodied in a variety of electronic file formats such as .doc, .docx, and .html), emails, social media texts, and other materials that may be embodied in electronic file formats.

Alerts, in the context of these teachings, are notifications that contain information that may be of interest or significance in the context of the purpose for which these teachings are being used. Incidents, in the context of these teachings, are descriptions of occurrences that are related or that may relate in nature, place or time in the context of the purpose for which these teachings are being used.

One manner of visual organization would involve a timeline that allows the user to select a discrete interval of time on the timeline (which may be, for instance, as short as a minute or as long as a number of weeks), view pieces of information associated with that discrete interval of time, view the location associated with each of the selected pieces of information associated with that discrete interval of time, and readily move from one interval of time on the timeline to another, whether backward or forward, displaying pieces of information and associated locations at each of such intervals in turn. Other ways of presenting information that may reflect different manifestations of potential geospatial and temporal relationships may also be developed. A system and method to accomplish the foregoing (referred to in this discussion as the TACCS™ Event File Manager) may be used, for example, by investigators to assemble relevant materials in different modes thought to be associated with a past, pending or anticipated event to enable a more coherent analysis of the materials and a better understanding of the event than would be possible were no such system and method to be available.

The ability to organize and display, in a coordinated and coherent manner and in a single temporal and locational context, materials of different kinds and originated in different media will be of substantial benefit in numerous applications. Investigators of various types (e.g., law enforcement or intelligence analysts seeking to understand the progress of a terrorist attack, system failure, or natural disaster) will find it beneficial, through the use of these teachings, to order materials selected based on possible relevance to a past, current or future event in temporal sequence and display them in locational context, so that they might, for example, discover information, contained in images or alerts, for instance, that disclose, in temporal and spatial relationships, different individuals of interest not theretofore understood to be associated, which relationships may support an inference of the existence of an association not previously appreciated, such inference being of a nature that might give rise, for instance, to potential avenues of investigation regarding past, current or future events involving one or both such individuals; discover, in connection with an on-going investigation, information of one or more temporal and spatial relationships that tends to refute an inference or conclusion that other information is properly associated with an investigation of a past, current or future event, thus enabling an investigator to disregard such other information; identify locations at which additional investigations might be made in the hopes of discovering, for instance, additional primary source materials, such as an image at one location at a given time giving rise to the possibility of finding additional primary source materials from social media or security cameras in nearby locations; explain the course of an investigation or the analysis behind a hypothesis on which such investigation may be based to third parties by, among other things, displaying in temporal and spatial context the primary source materials and other materials discovered the course of their investigation or used as the basis for such analysis; update their investigative or analytical materials with new primary source materials or other materials that may be added to the timeline to provide further support to an investigative course or an analysis, or give rise to different conclusions, depending upon the temporal and locational relationships revealed in the course of the display.

In one embodiment, implemented by a computer or a network of computers using the Touch Assisted Command and Control System (TACCS™), a computer software program developed by Priority 5 Holdings, Inc. (described in U.S. patent application Ser. No. 12/208,738, which is incorporated by reference herein is entirety and for all purposes and a portion of which is reproduced below), the system and method of these teachings involves the following steps:

Using any method, whether or not available in the TACCS™ software, for examining available primary source and other materials, which other materials may be materials that are not primary source materials but may, for instance, be useful in providing context or understanding to primary source materials or other materials, whether or not any of the primary source or other materials are embodied in an electronic file, identify from the available primary source or other materials each of the materials that may be relevant to an at least one past, current or possible future event of actual or potential interest, to which event has been or may be associated an at least one designated TACCS™ software Event File in the TACCS™ Event File Manager, and embody such materials in one or more electronic files in a format that may be made available using the TACCS™ software database and enter the files, embodied in the format, in the database.

Using one or more methods available in the TACCS™ software for searching or filtering electronic files in the TACCS™ software database, identify electronic files in the database that embody information constituting primary source materials or other materials, which primary source or other materials may be relevant to an at least one past, current or possible future event of actual or potential interest, to which event has been or may be associated an at least one designated TACCS™ software Event File.

Using software components available in the TACCS™ software or other software components commonly available, further identify each electronic file embodying materials so identified for possible relevancy by associating with the file, to the extent possible in the furtherance of and consistent with the system and method of these teachings and if not previously associated, data that associate such electronic file with at least one date, a begin time and an end time, a location (which may be a specific location or a defined area, for instance) and an icon.

Using software components available in the TACCS™ software, create at least one identified sub-file of an at least one designated TACCS™ software Event File and associate with the at least one identified sub-file at least one of the previously identified electronic files that embodies primary source or other materials.

Using software components available in the TACCS™ software, associate with the at least one identified sub-file of a designated TACCS™ software Event File, or create a new sub-file of a designated TACCS™ software Event File and associate with the new sub-file, other materials that may be relevant to the designated TACCS™ software Event File.

Using software components available in the TACCS™ software, select a designated TACCS™ software Event File of interest, and further select at least one of the identified sub-files in the TACCS™ software Event File, the at least one identified sub-file containing primary source materials or other materials that are desired to be displayed and that have been embodied in one or more compatible electronic files.

Enable a temporal viewing module in the TACCS™ software, the temporal viewing module to consist of a graphical user interface that includes a timeline component and a slider component, said components being used to manage the display of information in a temporal context.

Using components of the said temporal viewing module, specify from among the possible parameters made available by the temporal viewing module, or define, from any of the parameters permitted by the temporal viewing module to be defined, those parameters that control the manner in which the display is to be presented (for example, in the current embodiment, the parameters permit the specification of a temporal interval at which the slider may advance or retreat (e.g., in five minute increments)).

Using the timeline component of the said temporal viewing module, which component may include a visualization component, identify on a preliminary basis the periods of time associated with which there may be electronic files of a date or a volume that may indicate a reason to examine materials associated with said period of time before examining other materials associated with other periods of time, said identification to be facilitated by a display that indicates the varying numbers of electronic files containing such materials occurring in different periods of time of an equal, predetermined length across the entire timeline, said indication in the current embodiment being provided by shades of color of varying intensities.

Using components of the TACCS™ software, elect the location or area of interest for the display of the materials associated with at least one of the identified sub-files of the at least one TACCS™ software Event File.

Using the components of the said temporal viewing module, display, in their temporal sequence, each icon representing an electronic file containing a primary source material or other material, at the time, or during the period, and at the location, defined by temporal and geospatial metadata associated with said electronic file, each said electronic file to be associated with an identified sub-file that has been selected for inclusion in such display, such display to be accomplished through the use of the slider component of the said temporal viewing module with a slider being maneuvered along said graphical timeline component of the said temporal viewing module, manually or in intervals specified using the temporal viewing module, forward or backward in time, said primary source material or other material contained in said electronic file (such as a video clip, image, TACCS™ alert with its associated links) represented by said icon being available to view in a separate window in the display during the time said icon appears in the display by selecting said icon, said icon remaining on the display if and so long as the electronic file associated with said icon has an interval of time associated with it as defined by a start date and time and an end date and time, or a specific date and time associated with it, occurring during an interval of time then defined as being applicable to the operation of the slider, and such display to be also accomplished by identifying in a displayed listing of the selected identified sub-files of the designated TACCS™ software Event File a predetermined description of the primary source material or other material of each electronic file associated with each selected identified sub-file, such display of an electronic file to remain on the display if and so long as the electronic file has associated with it an interval of time, being identified by a start date and time and an end date and time, or has associated with it a specific date and time, occurring during an interval of time then defined as being applicable to the operation of the slider, the primary source material or other material embodied in said electronic file (such as a video clip, image, TACCS™ alert with its associated links) being available to view in a separate window in the display during the time said electronic file appears in the display by selecting said file.

The system and method of these teachings, in one embodiment being, in the case of a video file of greater length containing primary source or other material, capable of being viewed in said pop-up window with the timing of the display of the video in the pop-up being synchronized in time with the operation of the slider across the timeline component.

The system and method of these teachings, in one embodiment having multiple video files containing primary source or other material, each being capable of being viewed in a separate pop-up window, with the timing of the displays of the videos in the separate pop-up windows being synchronized in time with the operation of the slider across the timeline component and with each other.

The system and method of these teachings, in one embodiment, in the case of one or more electronic files lacking the association of a location, the primary source materials or other materials embodied in said one or more electronic files not being available for display using the slider component, but being available for display by selecting the electronic file as it appears in the list of electronic files contained in an identified sub-file of a designated TACCS™ software Event File.

The system and method of these teachings, in one embodiment, maintaining an audit log of all changes made to the at least one designated TACCS™ software Event File.

The system and method of these teachings are, in one embodiment, implemented using a computer or network of computers and computer readable code, embodied in a computer usable medium, that uses information obtained from one or more databases and relevant geospatial information, descriptions of assets and asset dependencies for an event driven simulation of the behavior of the assets. Although these teachings are not limited to the exemplary embodiment, in one exemplary embodiment the system and methods are implemented using the Touch Assisted Command and Control System (TACCS™) which is disclosed in U.S. patent application Ser. No. 12/208,738, which is incorporated by reference herein in its entirety and for all purposes.

Figure 5:
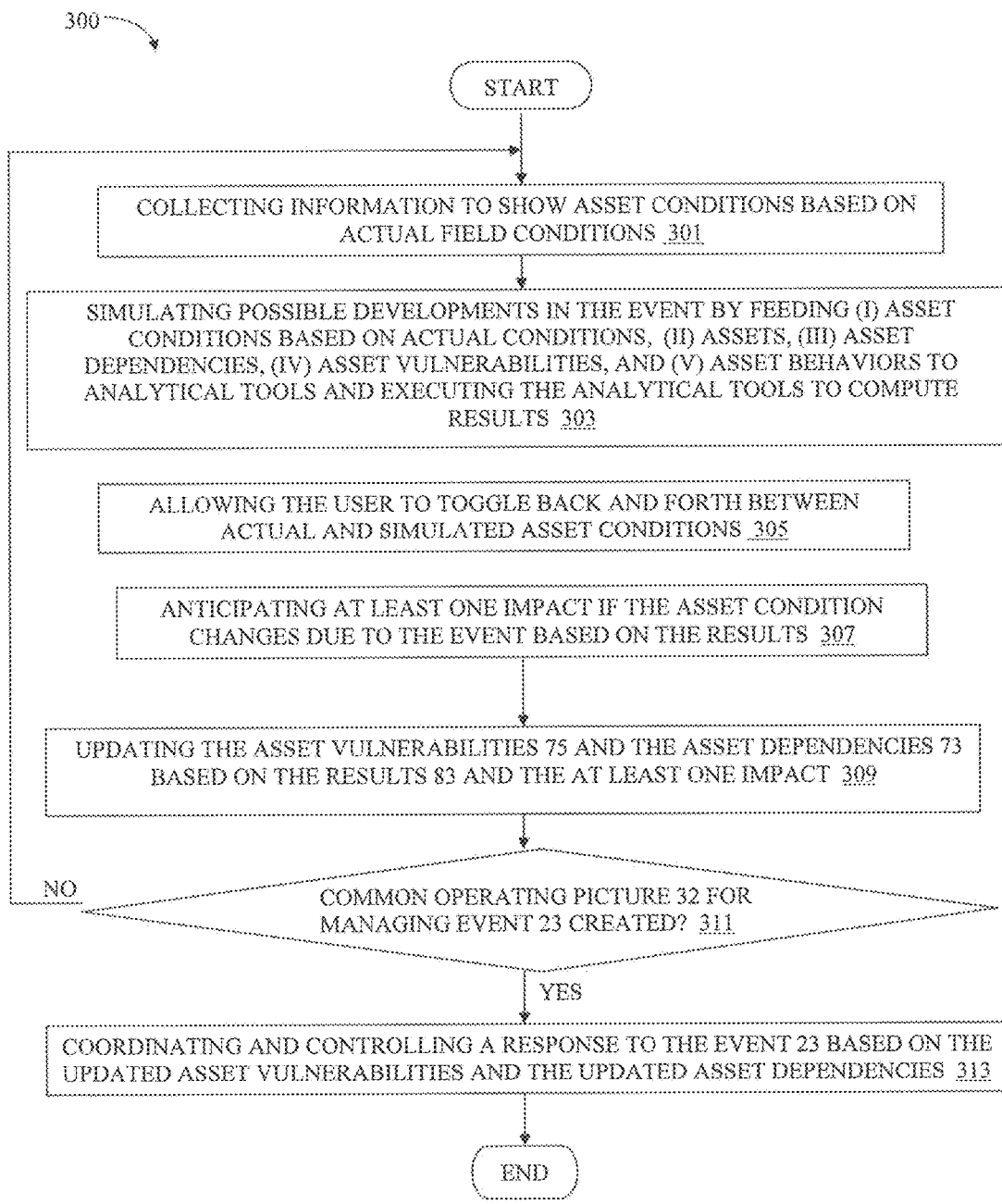
FIG. 5 is a flowchart of the use of the system of the present embodiment for management of an actual event.
Figure 5A:
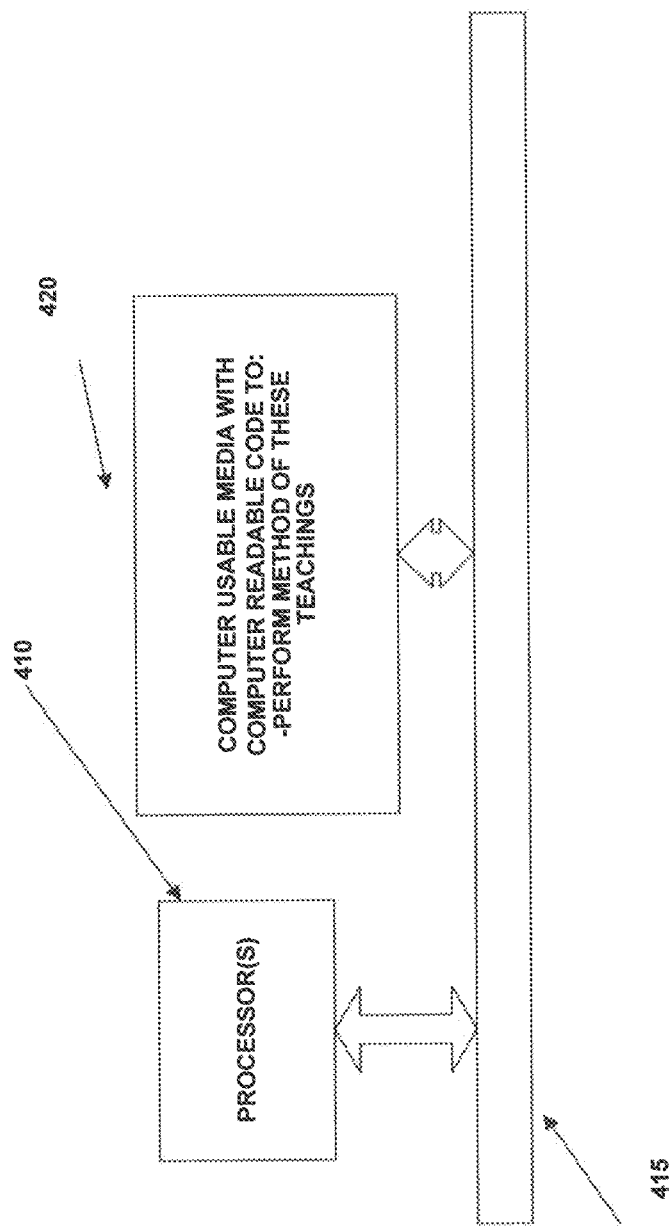
FIG. 5a is a schematic block diagram representation of an embodiment the system of these teachings.

FIG. 5a is a schematic block diagram representation of an embodiment the system of these teachings. Referring to FIG. 5a, in the embodiment shown therein, one or more processors 410 are operatively connected to computer usable media 420 that has computer readable code embodied therein, which when executed by the processors 410 causes of processors to perform their method of these teachings, in one embodiment, the method disclosed hereinabove. The one or more processors are operatively connected to the computer usable media 420 by a computer interconnection component 415 (such as a computer bus).

An exemplary embodiment is presented herein below referring to FIGS. 6-10. It should be noted that these teachings are not limited to only that exemplary embodiment.

Figure 6:
FIG. 6 is a screenshot obtained using an embodiment of the method and system of these teachings.

FIG. 6 is a screenshot showing the method of these teachings as it would appear in the embodiment to an operator of the Touch Assisted Command and Control System (TACCS™) on the TACCS™ operator display of an illustrative event (a storm in New York City) using the TACCS™ Event File Manager feature. The display of the designated TACCS™ software Event File is embodied in the display box entitled EV03-04MR15: New York Storm Event shown on the left side of FIG. 6. The event being monitored using the designated TACCS™ software Event File so shown is a storm characterized by winds of high velocities. The earliest occurring piece of information to be associated in the designated Event File is the issuance, on Feb. 27, 2015, at 11:32 A.M., by the National Weather Service, of a high wind alert. That information is embodied in an alert that appears in the alert box (Alert Details) of the TACCS™ system shown on the right side of the screenshot, and is indicated by the icon to which the alert box is attached (the alert box would only appear in the operator's display if the operator were to take further action to cause the box to appear, such as clicking on the icon; in one embodiment of these teachings, the alert box would not automatically appear). Although no descriptive information is contained in the alert box as displayed, the text of the alert and other information may be added in the text box labeled Description. The alert icon (the diamond) is showing at a location on the display that is in the approximate center of the polygon that circumscribes some or all of the area forecast by the National Weather Service as the area to be affected by the warning. The existence of the alert is identified by being shown in the Alert sub-file of the designated Event File listings in the bottom portion of the designated Event File display. In the temporal viewing portion of the designated Event File display can be seen a horizontal timeline, with beginning and ending date/time identifiers. The interval of time that defines the timeline is shown as starting at the same time as the Begin time of the alert. The slider is shown in the left extremity of the timeline. The interval of time defined by the slider begins at the date and time shown in the center of the timeline. The end time of that interval is determined by adding to the start time shown in the center of the timeline that period of time identified to the right of the date/time identifier. That period of time may be, in the above embodiment, as short as a minute (+1 minute) or as long as a week, for example (e.g., +1 week). In FIG. 6, the interval is identified as 12 hours (+12 hours). The high wind alert shown in the designated Event File (appearing both in the designated Event File and in the form of the icon and polygon on the geospatial display) is, in the above embodiment of these teachings, so shown because a portion of the interval of the alert, as defined by the Begin time and the End time of the alert, falls within the interval of time defined by the slider (Feb. 27, 2015, 11:32 A.M+12 hours). As can be seen from the designated Event File display, no incidents, images or videos occur during the interval defined by the slider.

Figure 7:
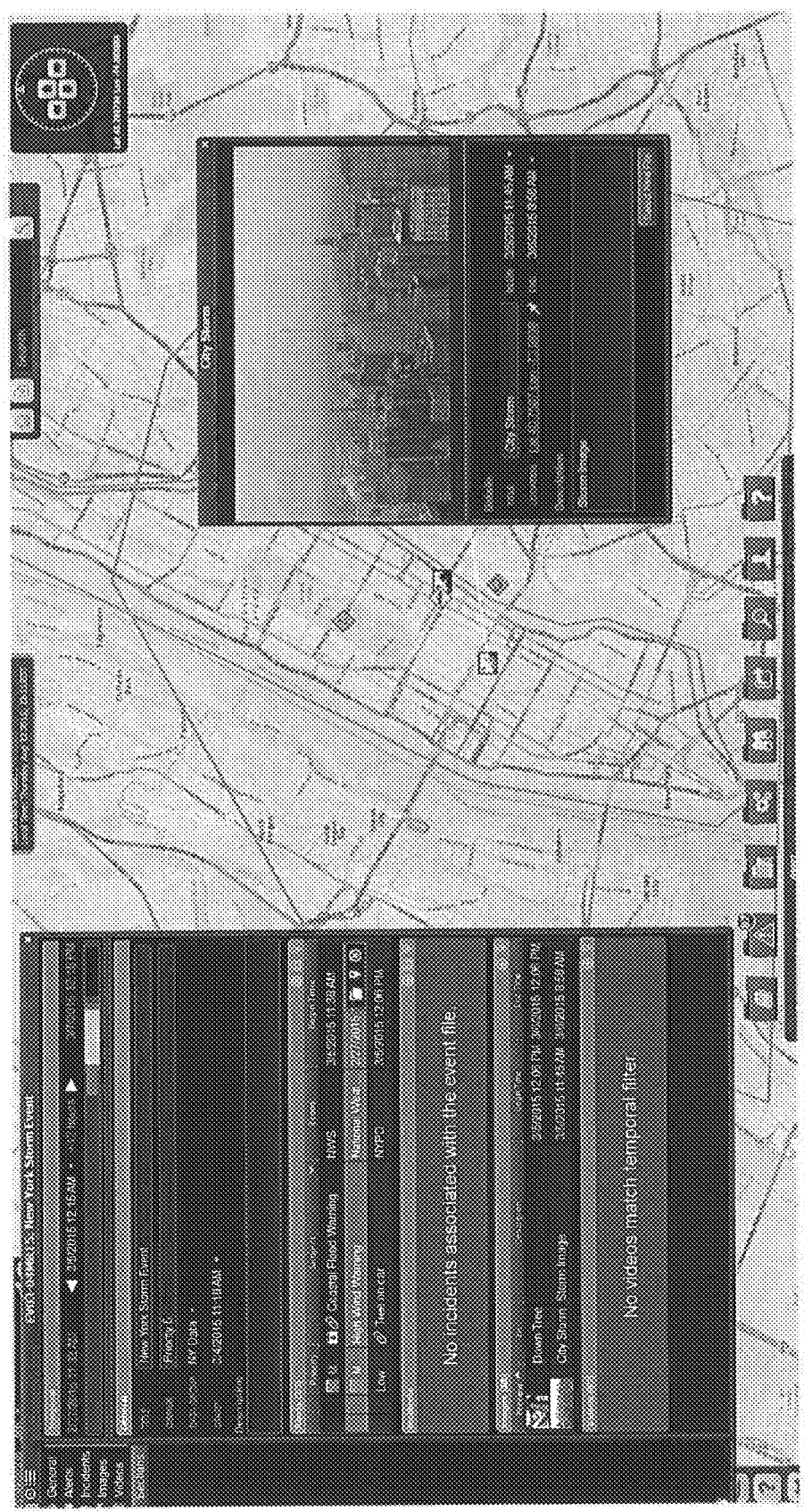
FIG. 7 is another screenshot obtained using the above embodiment of the method and system of these teachings, the screenshot being obtained at a different time interval.

FIG. 7 is a screenshot of the method of these teachings as described above, with the slider and the interval of time defined by the slider having been advanced to Mar. 5, 2015, from 12:15 A.M. to 12:15 P.M. (that time period being identified by the legend "+12 hours"). Additional icons have appeared on the geospatial display to indicate additional information having been associated with the designated Event File, with such additional information having intervals of time (defined by Begin times and End times) that occur, in whole or in part, within the interval defined by the slider. An icon representing a photograph, the icon having an appearance that is different from that of icons representing other types of information, now appears on the display, and has been accessed to reveal the photograph that it represents, shown in the display box to the right of the screenshot.

Figure 8:
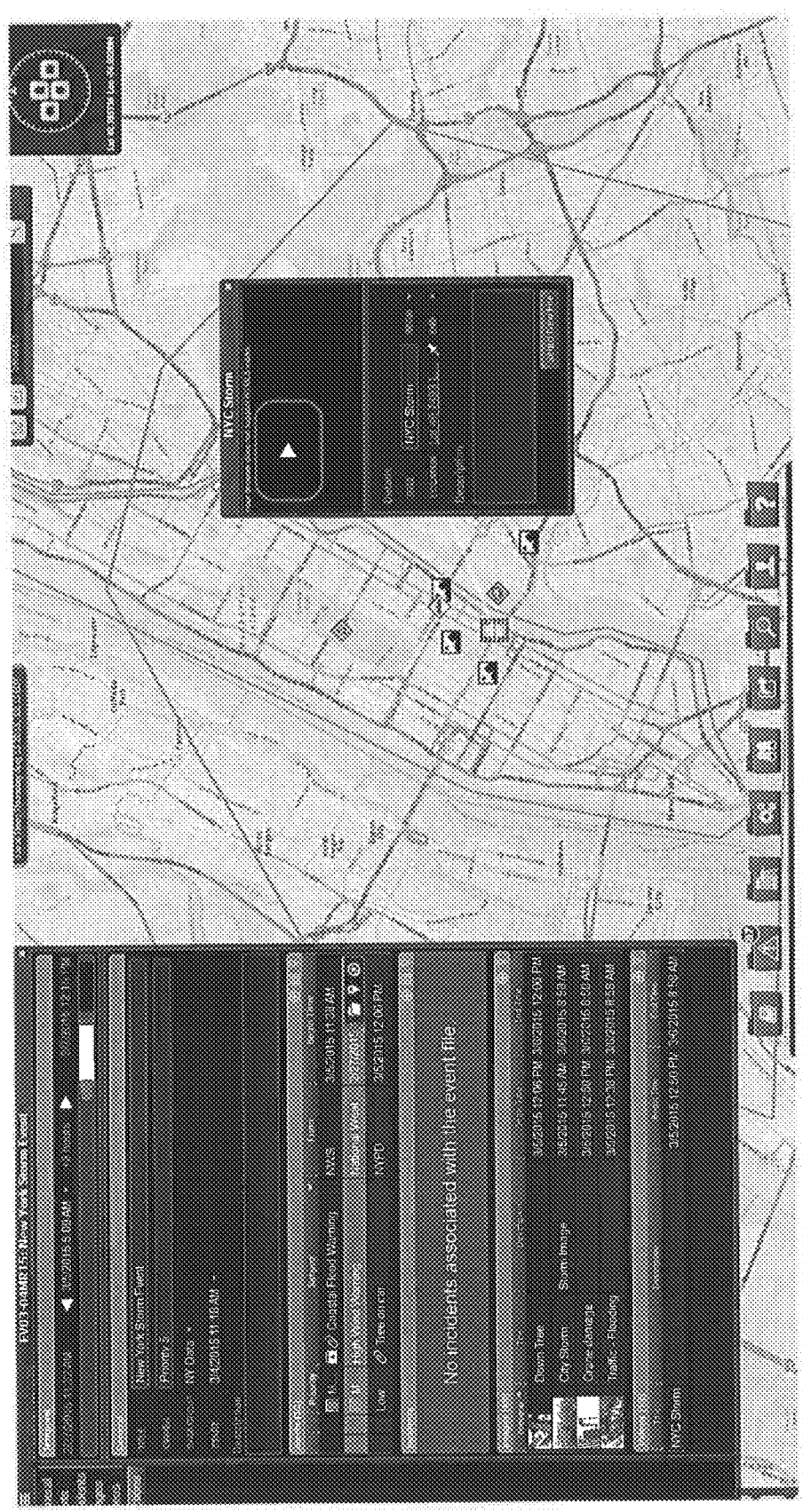
FIG. 8 is yet another screenshot obtained using the above embodiment of the method and system of these teachings, the screenshot being obtained at another different time interval.

FIG. 8 is a screenshot of the method of these teachings as described above, with the slider and the interval of time defined by the slider having been advanced to Mar. 5, 2015, from 5:09 A.M. to 3:09 P.M. (+8 hours). Additional icons have appeared on the geospatial display to indicate additional information having been associated with the designated Event File and relating to the interval defined by the slider in the manner described above. An icon representing a video clip, the icon having an appearance that is different from that of icons representing other types of information, now appears on the display, and has been accessed to reveal the means for showing the video clip that it represents, shown in the display box to the right of the screenshot.

Figure 9:
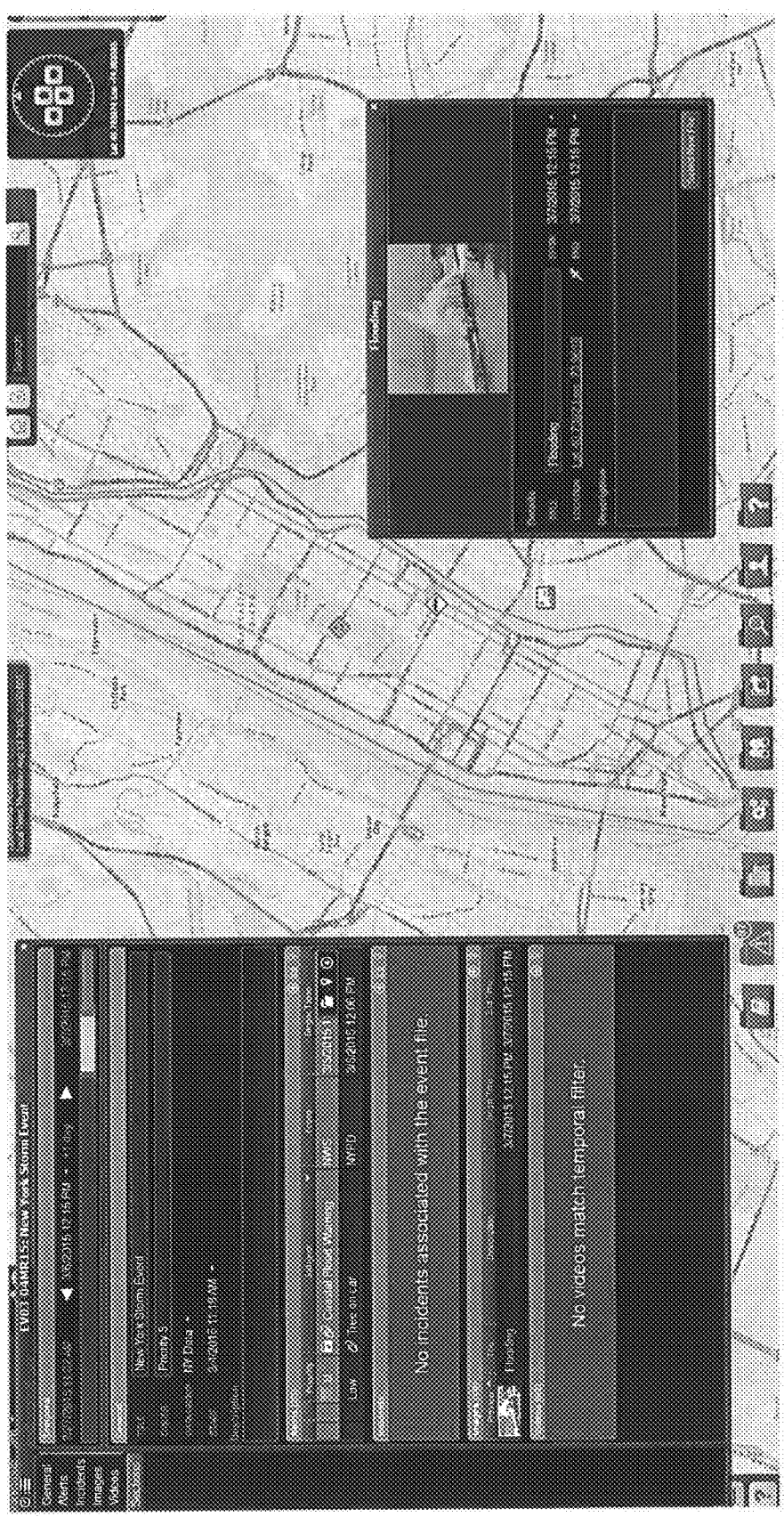
FIG. 9 is still another screenshot obtained using the above embodiment of the method and system of these teachings, the screenshot being obtained at still another different time interval.

FIG. 9 is a screenshot of the method of these teachings as described above, with the slider and the interval of time defined by the slider having been advanced to Mar. 6, 2015, from 12:15 P.M. to Mar. 7, 2015, at 12:15 P.M. (+1 day). One new icon has appeared on the geospatial display to indicate additional information having been associated with the designated Event File and relating to the interval defined by the slider in the manner described above. Most of the other icons have disappeared from the display, indicating that the periods of time defined by the Begin and End times of the associated electronic files do not overlap with the interval defined by the slider.

Figure 10:
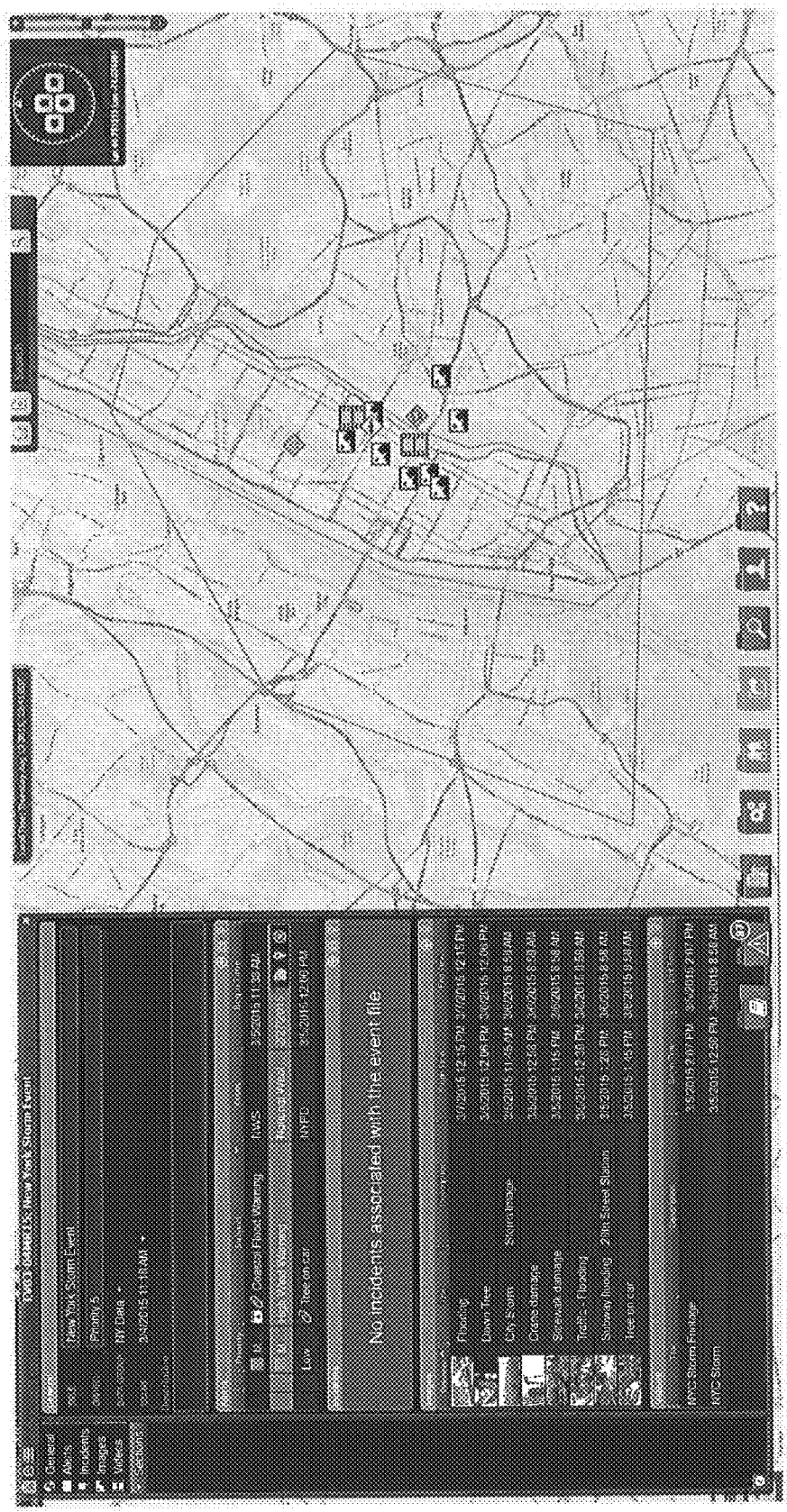
FIG. 10 is a screenshot of the contents of a designated Event File.

FIG. 10 is a screenshot in the TACCS™ software of the contents of the designated TACCS™ software Event File, the pertinent sub-files and the entries indicating the information associated with each of the sub-files. The temporal function may be accessed in one embodiment of these teachings by clicking with a mouse on the icon of the clock in the upper left portion of the title bar.

A summary description of the TACCS™ software, as disclosed in U.S. patent application Ser. No. 12/208,738, is presented herein below. The TACCS™ software, as disclosed in U.S. patent application Ser. No. 12/208,738, is an event driven simulation software and does not use critical decision points (CDPs), CDPs being identified moments where a decision has greater potential to affect an outcome.

Referring now to FIG. 1, system 150 for training personnel to respond to event 23, or for creating and testing policies and procedures to respond to event 23, or for responding to event 23 can include, but is not limited to including, information collector 38 determining location information 43 and assets 53 associated with event 23, base canvas processor 25 creating base canvas 27A using at least one data feed 13, location information 43, and information associated with assets 53. Base canvas 27A can have imagery 27 and at least one data layer 31 that is overlain upon base canvas 27A. Base canvas processor 25 can continuously update at least one data layer 31 with information from at least one data feed 13. System 150 can further include geospatial processor 51 correlating and geospatially aligning at least one data layer 31 with imagery 27 and base canvas 27A according to location information 43. System 150 can also include asset/data layer associator 62 identifying assets 53 associated with location information 43 and associating assets 53 with at least one data layer 31, user interface 21 receiving selected assets 54 from assets 53 from a user who is interfacing with at least one data layer 31 provided by base canvas processor 25 while base canvas processor 25 aggregates data from at least one data feed 13 associated with assets 53, and asset data processor 87 identifying asset dependencies 73 and asset vulnerabilities 75 associated with selected assets 54. System 150 can still further include an interdependency network used by simulator 17 which simulates event 23 based on selected assets 54, location information 43, asset condition 39, base canvas 27A, at least one data layer 31, asset vulnerabilities 75, asset dependencies 73, and asset behaviors. Simulator 17 can update asset conditions 39 based on the simulation, and simulator 17 can send results 83 of the simulation to user interface 21. Simulator 17 can continue the simulation until the training is complete, or until the policies and procedures are created or tested, or until the event has concluded.

Figure 2:
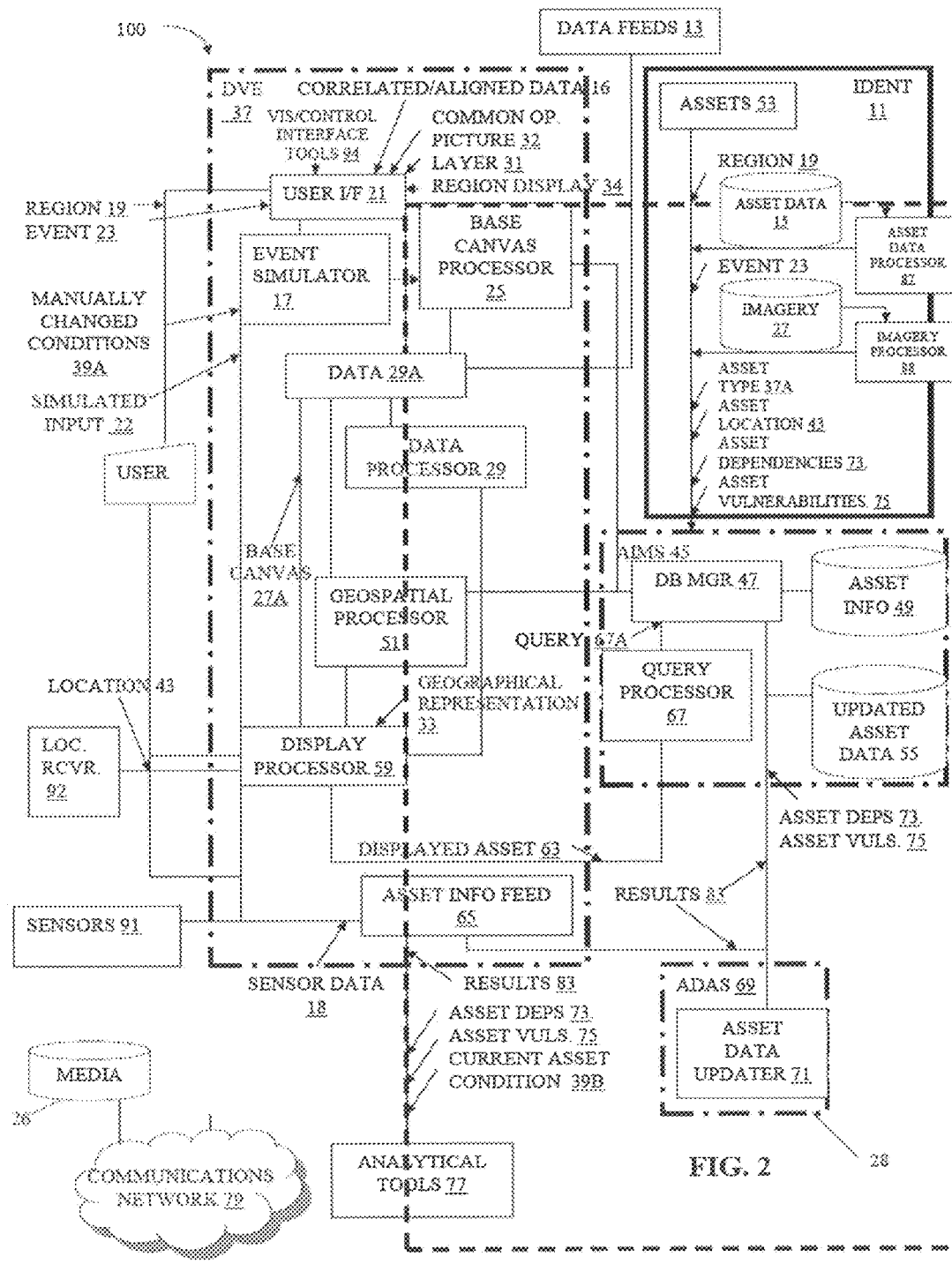
FIG. 2 is a schematic block diagram of an exemplary embodiment of the event system.

Continuing to refer primarily to FIG. 1, system 150 can optionally include information manager 46 grouping assets 53 according to an asset type 37A, automatically deriving dependency, vulnerability, and behavior information from assets 53 based on asset type 37A (FIG. 2), and storing dependency, vulnerability, and behavior information as asset-specific or type-specific data 58 on computer-readable medium 26 (FIG. 2). System 150 can further optionally include conflict resolver 64 identifying and resolving conflicts among information received from a plurality of data feeds 13, each containing analysis information. Base canvas processor 25 can superimpose the resolved data feeds on at least one data layer 31. System 150 can also optionally include impact analyzer 56 anticipating at least one impact based on asset condition 39, asset dependencies 73, asset vulnerabilities 75, and asset behaviors, updating asset conditions 39 according to an effect of at least one impact on selected assets 54, and providing a notification to the user by flagging assets 53 with changed data or changed asset conditions. Simulator 17 can simulate event 23 based on selected assets 54, location information 43, asset condition 39, and updated assets 55, and can update updated assets 55 and asset condition 39 based on the simulation. System 150 can optionally include cost/benefit analyzer 36 choosing a change to selected assets 54 based on a cost/benefit analysis of updated assets 55.

Referring now to FIG. 2, system 100 can create common operating picture 32 that can be understood by culturally disparate public and private agencies and organizations to train decision makers by allowing them to view results of their actions in a simulated environment, and to manage unexpected events in a command and control environment. System 100 can provide the ability to display asset location information 43, aggregate asset data 15 obtained from multiple sources and display/visualize these aggregated data, identify asset dependencies 73 and vulnerabilities 75, and utilize analytical tools 77 to perform disruption impact analyses. System 100 can be used to develop and test policies and procedures to respond to unexpected events 23 such as, for example, terrorist events and natural disasters, and can train decision makers by allowing them (1) to view results 83 of their actions in a simulated environment, and (2) to manage unexpected events 23 in a command and control environment.

Continuing to refer to FIG. 2, system 100 can include, but is not limited to including, identification process 11 configured to identify, classify or typify, locate, and understand what is Critical Infrastructure/Key Resources (CI/KR) known herein also as key assets and what is not. Identification process 11 can include, but is not limited to determining the vulnerabilities and dependencies of selected CI/KR assets, and selecting the best source of imagery to utilize as a base canvas for visualizing event scenarios. Identification process 11 can include imagery processor 88 which can optimally incorporate images ranging from simple charts or diagrams to complex images from sources such as, for example, Geographic Information System (GIS) databases, data management tools, for example, ESRI® ARCGIS®, streaming feeds, for example, DIGITALGLOBE™, and other complex data sources, and can provide structure to the complexity of CI/KR and its classification or organization into asset types 37A. System 100 can also include automated data aggregation system (ADAS) 69 configured to determine who owns a critical infrastructure or asset 53 and how to contact the owner of asset 53. ADAS 69 can also be configured to collect geospatial, public, internet, internal, private, and official raw data.

Continuing to still further refer to FIG. 2, system 100 incorporates analytical tools 77 that can be configured to identify the effects that result from interdependencies between infrastructure components. Interdependencies can include physical/direct linkages, indirect (geospatial) linkages, policy/procedural dependencies, informational dependencies, societal dependencies, and supply chain dependencies.

Continuing to still further refer to FIG. 2, system 100 can also include data visualization engine (DVE) 37 configured to integrate received data into one visual network and serve as common operating picture 32 for command and control. DVE 37 can be configured to illustrate the consequences based on a behavior attribute. DVE can be configured to acquire two dimensional and/or three dimensional imagery of an area of interest, thereby creating an easily understood functional canvas which can be subsequently used to present asset data and the results of analyses. Data resolution requirements can vary depending on the nature of the analysis. Imagery types can include charts, diagrams, three dimensional structures, topographical mapping, orthophoto production, planimetric mapping, digital elevation models, and terrain modeling.

Continuing to still further refer to FIG. 2, system 100 can also include asset information management system (AIMS) 45 configured to provide structure, an asset catalog, security, fast access, and flexible and expandable storage. AIMS intelligently manages CI/KR information, asset details, and vulnerabilities and dependencies and their effect on the performance of an asset 53, such as, for example, required inputs, outputs produced, sustainability, sensitivities, consequences of failure, and recovery limitations. Based on this analysis, other assets that impact the function of the critical assets can be identified and added to asset information database 49. For example, input for a diesel generator might include diesel fuel lubricating oil, cooling water, Supervisory Control and Data Acquisition (SCADA) for automatic startup, and human activity for manual startup; output might include exhaust and electricity; and vulnerabilities might include high water level due to flooding and vibration damage due to a seismic event.

Continuing to still further refer to FIG. 2, identification process (IDENT) 11 can be utilized to, for example, (1) identify region 19 of interest and at least one disaster or disruptive event 23, (2) obtain imagery 27 to prepare base canvas 27A and three dimensional data 29A associated with region 19 of interest, (3) identify a plurality of assets 53 required to respond to the at least one disaster or disruptive event 23, and (4) identify asset dependencies 73 and asset vulnerabilities 75. DVE 37 can be configured to, for example, (1) prepare base canvas 27A and the three dimensional data 29A associated with region 19 of interest, (2) superimpose asset data 15 in a manner that it appears to the user, for example by user interface 21, as data layer 31 for each of the asset types 37A, (3) superimpose graphical representations 33 associated with assets 53, (4) create region display 34 including base canvas 27A, the plurality of data layers 31, data feeds 13, graphical representations 33, and control interface tools 94, (5) display region display 34, (6) geospatially align the plurality of data layers 31 and data feeds 13 with base canvas 27A according to location information 43, (7) enable manipulation of region display 34 in order to view selected areas, display assets 53 and associated graphical representations 33 in the selected areas, (8) provide asset dependencies 73, asset vulnerabilities 75, disaster or disruptive event assets 53, sensor data 18, and current asset condition 39B, to analytical tools 77 through asset information feed 65, (9) receive results 83 from analytical tools 77, (10) determine current asset condition 39B based on results 83, and (11) retrieve, aggregate and display asset data 15 from displayed assets 63 using display processor 59.

Continuing to still further refer to FIG. 2, AIMS 45 can be configured to, for example, (1) manage, by, for example, database manager 47, the retrieval and/or storage of asset information 49, and information stored in external databases, (2) store asset data 15, and updated assets 55, (3) store asset information 49, which may include asset data 15, asset location information 43, asset dependencies 73, and asset vulnerabilities 75, (4) receive query 67A of displayed assets 63, (5) retrieve, by, for example, query processor 67, asset information 49 associated with displayed assets 63 based on query 67A, (6) receive results 83 from analytic tools 77, and (7) update asset data 15 forming updated assets 55 based on results 83. ADAS 69 can be configured to, for example, (1) obtain updated assets 55 from asset data updater 71 by comparing query results from query 67A to asset information 49, and (2) obtain information about assets 53 within region 19. AIMS 45 and DVE 37 can be configured to train personnel, test policies and procedures associated with disaster or disruptive event 23, and provide common operating picture 32 for command and control of disaster or disruptive event 23 by using sensor data 18 from sensors 91, simulated input 22, or manually changed conditions 39A to determine current asset condition 39B associated with disaster or disruptive event 23, by feeding displayed assets 63, asset dependencies 73, and asset vulnerabilities 75 to analytical tools 77, and by replacing asset data 15 with updated assets 55 and repeating these steps as disaster or disruptive event 23 evolves, providing results 83 that can be shared, for example, by communications network 79, among multiple displays and used to coordinate and control a response to disaster or disruptive event 23, including deploying and tracking assets based on location information 43 received from location receiver 92.

Continuing to still further refer to FIG. 2, an example of the use of system 100 is an urban setting in which the availability of care during and after flooding in proximity to a hospital is of concern. Factors that could influence the availability of care can include availability of electric power, ability to sustain operation after loss of power, and access to the hospital. After system 100 is executed, during an after action review, it could be found that the simulation indicates that current system architectures do not take into account the consequences of power supply interdependencies. System 100 can be used to identify architecture redesign aspects such as, for example, having portable standby dewatering pumps that could be brought to bear, having an alternative source of power to the pump, hardening the substation to prevent water ingress, increasing fuel storage at the hospital, having a means of fuel delivery that does not require the use of the main access routes, having a second source of power to the hospital, and carrying fuel to the hospital on boats. After the cost/benefit analysis of possible remedial actions is complete, system 100 can be provided with the information as modified by the result of the cost/benefit analysis, and can be used to simulate the flooding event again.

Figure 3A:
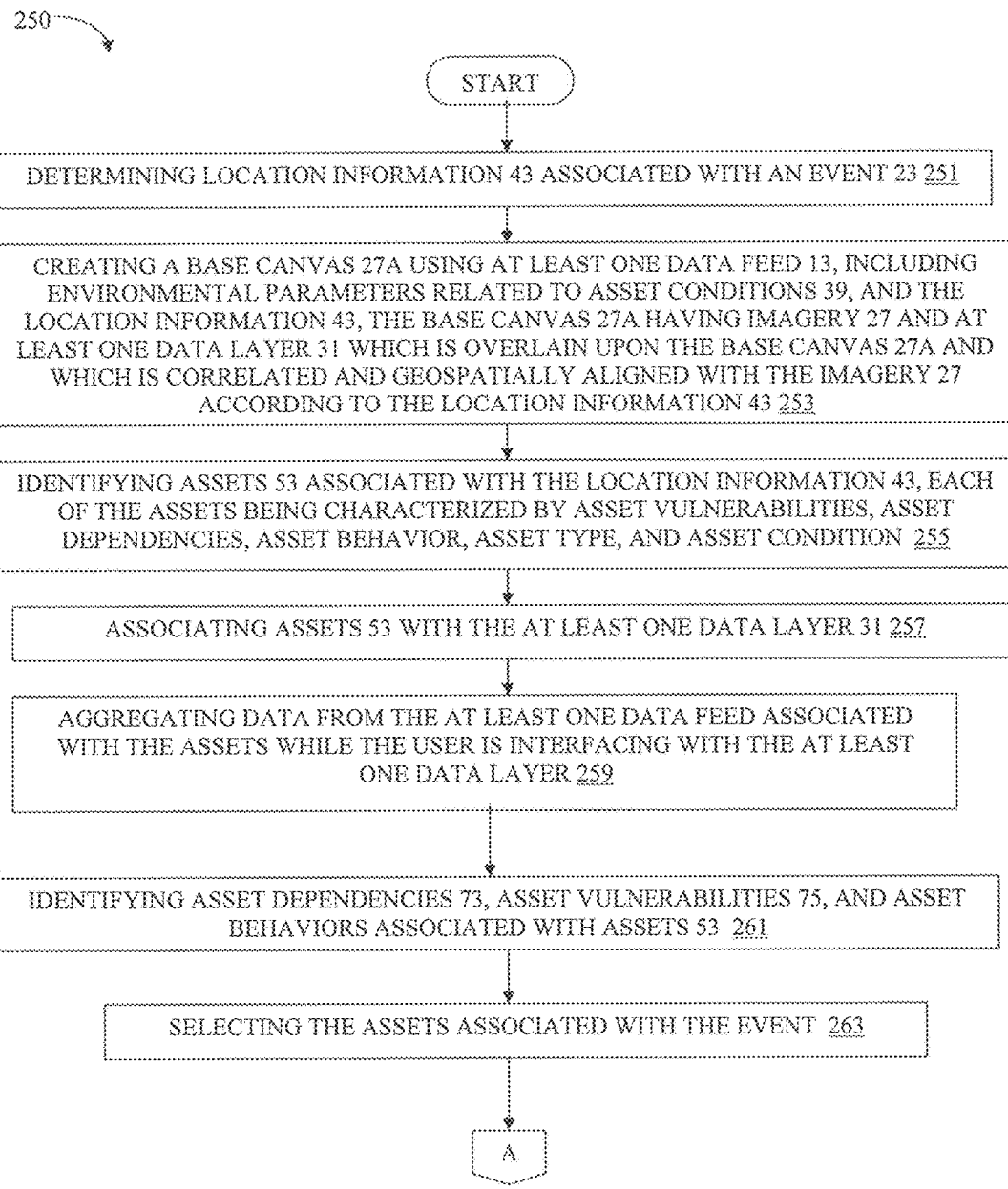
FIGS. 3A-3B are flowcharts of the method of the present embodiment.
Figure 3B:
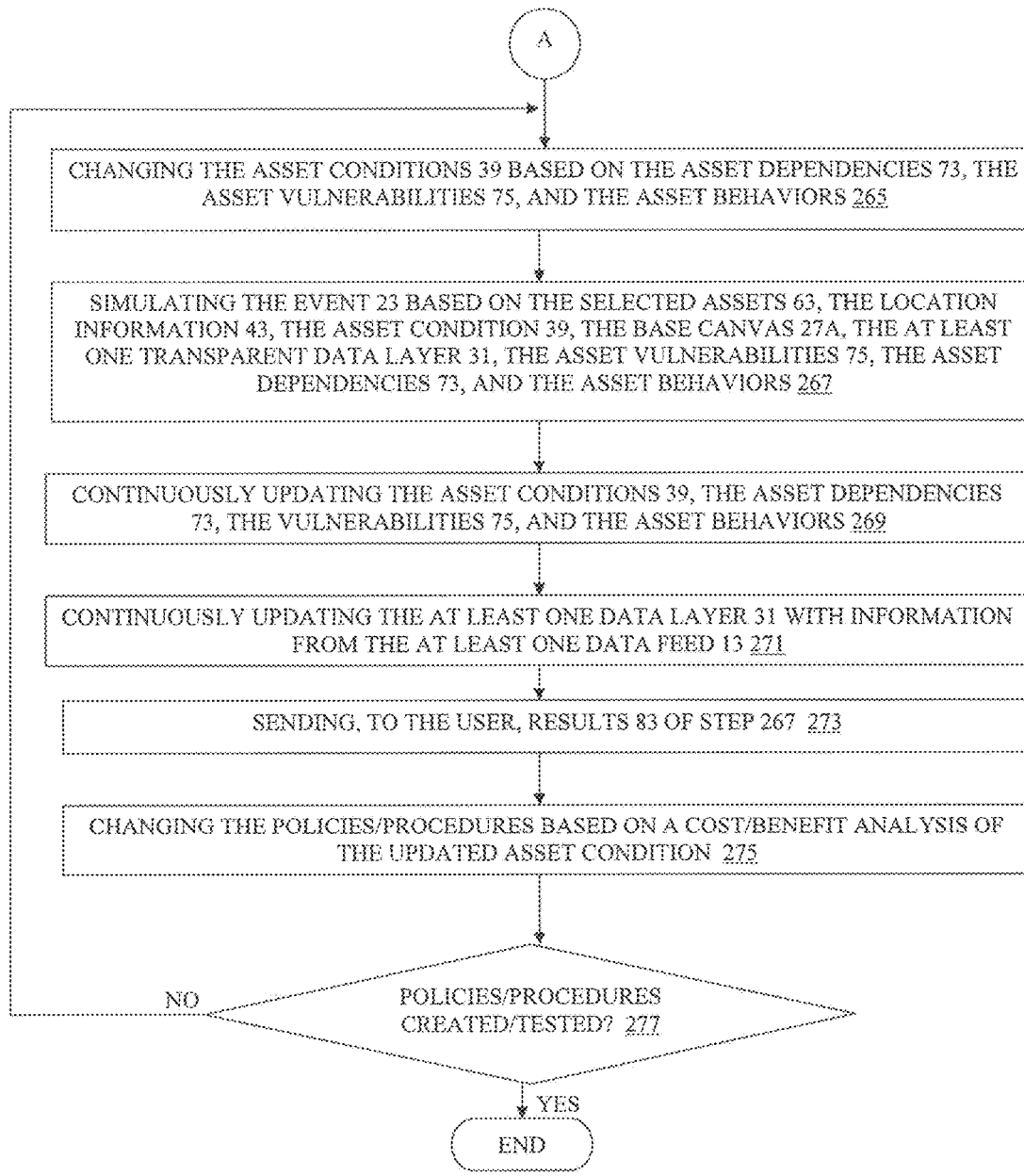

Referring primarily to FIGS. 3A-3B, method 250 for creating and testing procedures/policies to respond to an event 23 can include, but is not limited to including, the steps of (a) determining 251 location information 43 associated with event 23, and (b) creating 253 base canvas 27A using at least one data feed 13, which can include, but is not limited to including, environmental parameters related to asset conditions such as, for example, ambient temperature, and location information 43. Base canvas 27A can include imagery 27 and at least one data layer 31 which can be overlain upon base canvas 27A and which can be correlated and geospatially aligned with imagery 27 according to location information 43. Method 250 can also include the steps of (c) identifying 255 assets 53 associated with location information 43, each of the assets being characterized by asset vulnerabilities, asset dependencies, asset behavior, asset type, and asset condition, (d) associating 257 assets 53 with at least one data layer 31, (e) aggregating 259 data from at least one data feed 13 associated with assets 53 while the user is interfacing with at least one data layer 31, and (f) identifying 261 asset dependencies 73, asset vulnerabilities 75, and asset behaviors associated with assets 53. Method 250 can also include the steps of (g) selecting 263 assets 53 associated with event 23, (h) changing 265 asset condition 39 based on asset dependencies 73, asset vulnerabilities 75, and asset behaviors, and (i) simulating 267 event 23 based on selected assets 54, location information 43, asset condition 39, base canvas 27A, at least one data layer 31, asset vulnerabilities 75, asset dependencies 73, and asset behavior. Method 250 can still further include the steps of (j) continuously updating 269 asset condition 39 based on asset vulnerabilities 75, asset dependencies 73, and asset behaviors, (k) continuously updating 271 at least one data layer 31 with information from the at least one data feed 13, (1) sending 273 results 83 of the step of simulating to the user, (m) changing 275 the policies/procedures based on a cost/benefit analysis of the updated asset condition, and repeating 277 steps (h)-(m) until the policies and procedures are created and tested.

Method 250 can optionally include the steps of recording asset dependencies 73 and asset vulnerabilities 75 on computer-readable medium 26, grouping assets 53 according to asset type 37A, automatically deriving type-specific data from assets 53 based on asset type 37A, and storing the asset-specific or type-specific data on computer-readable medium 26. Method 250 can also optionally include the step of applying visualization and control interface tools 94 so that assets 53 appear to the user to be operating in the at least one data layer 31. Method 250 can still further optionally include the steps of identifying an alternate group of data feeds from data feeds 13, identifying and resolving conflicts among information received from data feeds 13 and the alternate group using predetermined algorithms, identifying specific data feeds from data feeds 13 that contain analytical information, and superimposing the analytical information on at least one data layer 31.

Figure 4A:
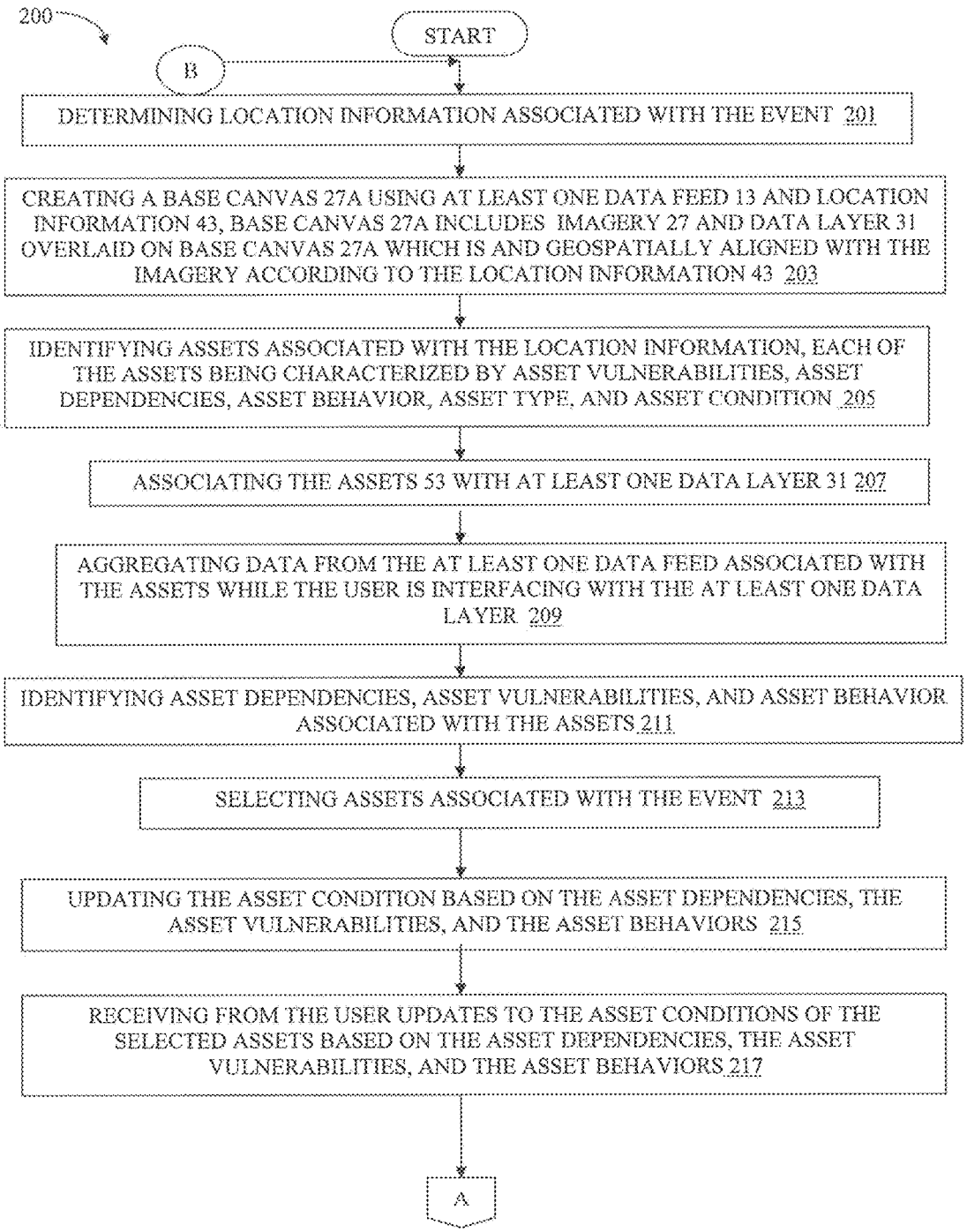
FIGS. 4A-4B are flowcharts of an illustrative method of use of the system of the present embodiment for training and policy development.
Figure 4B:
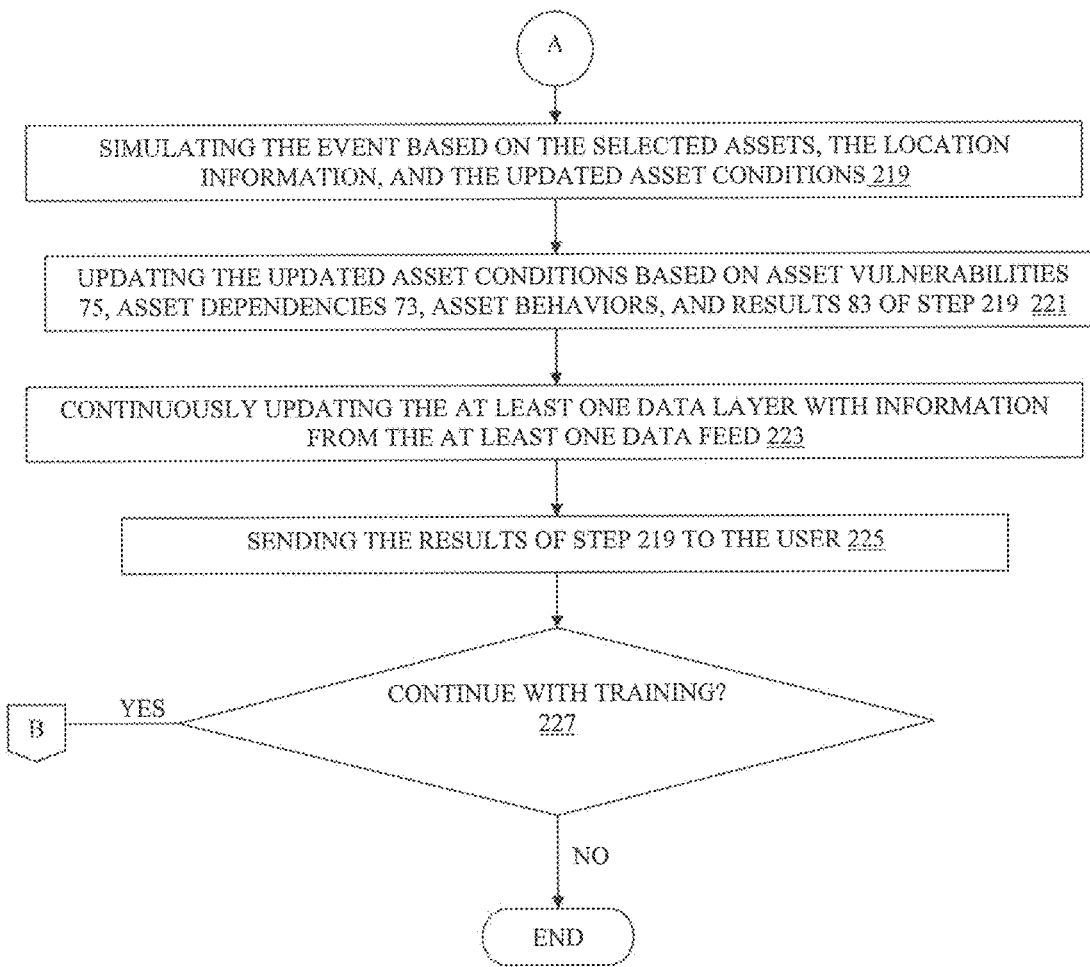

Referring now primarily to FIGS. 4A-4B, method 200 for training personnel to respond to an event 23 can include, but is not limited to including, the steps of (a) determining 201 location information 43 associated with event 23, and (b) creating 203 base canvas 27A using at least one data feed 13 and location information 43. Base canvas 27A can include imagery 27 and at least one data layer 31 overlain upon base canvas 27A which is correlated and geospatially aligned with imagery 27 according to location information 43, (c) identifying 205 assets 53 associated with location information 43, each asset 53 being characterized by asset vulnerabilities 75, asset dependencies 73, asset behavior, asset type 37A, and asset condition 39, (d) associating 207 assets 53 with at least one data layer 31, and (e) aggregating 209 data from at least one data feed 13 associated with the assets 53 while the user is interfacing with at least one data layer 31. Method 200 can also include the steps of (f) identifying 211 asset dependencies 73, asset vulnerabilities 75, and asset behavior associated with assets 53, (g) selecting 213 assets 53 associated with event 23, (h) updating 215 asset condition 39 based on asset dependencies 73, asset vulnerabilities 75, and asset behaviors, (i) receiving 217 from the user updates to asset conditions 39 of selected assets 54 based on asset dependencies 73, asset vulnerabilities 75, and asset behaviors. Method 200 can further include the steps of (j) simulating 219 event 23 based on selected assets 54, location information 43, the updated asset conditions, (k) updating 221 the updated asset conditions based on asset vulnerabilities 75, asset dependencies 73, asset behaviors, and results 83 of step (j), (l) continuously updating 223 at least one data layer 31 with information from at least one data feed 13, (m) sending 225 results 83 of step (j) to the user, and (n) repeating 227 steps (i)-(m) until the training is complete. Method 200 can optionally include the step of feeding asset condition 39, asset dependencies 73, asset vulnerabilities 75, and asset behaviors to analytical tools 77 to create the modified asset conditions.

In an alternate embodiment, an alternate method for aggregating and displaying asset information to create a common operating picture 32 that can be utilized to simulate an event 23 to train personnel and develop and test policies and procedures can include, but is not limited to, the steps of (a) preparing base canvas 27A from imagery 27 and data 29A associated with region 19 of interest associated with event 23, (b) identifying assets 53 required to respond to event 23, (c) identifying asset data 15 related to assets 53; (d) supplementing asset data by conducting automated queries against data feeds 13, (e) receiving location information 43 for assets 53, and (f) correlating and geospatially aligning data layers 31 and data from data feeds 13 with base canvas 27A according to location information 43. The alternate method can also include the steps of (g) providing correlated/aligned data 16, data layers 31, and base canvas 27A to the user, and (h) aggregating correlated/aligned data 16 into region display 34 including base canvas 27A, data layers 31, data from data feeds 13, and graphical representations 33 associated with selected assets 54 from assets 53. The alternate method can still further include the steps of (i) querying selected assets 54 to retrieve supplemented asset data associated with selected assets 54, (j) identifying, from supplemented asset data, asset dependencies 73, asset vulnerabilities 75, and asset behaviors of selected assets 54, and (k) creating common operating picture 32 based on base canvas 27A, data layers 31, data from data feeds 13, asset dependencies 73, asset vulnerabilities 75, and asset behaviors.

The alternate method can optionally include the steps of (l) identifying the region 19 of interest and event 23, (m) receiving and processing imagery 27 associated with region 19, (n) grouping assets 53 according to asset type 37A, (o) displaying each of asset type 37A as one data layer 31, (p) configuring location information 43 of one or more of graphical representations 33 so that location information 43 appears to be located on data layer 31, (q) displaying region display 34, (r) enabling manipulation of region display 34 in order to view selected areas within region display 34, (s) displaying selected assets 54 associated with graphical representations 33 in the selected areas, (t) aggregating and displaying asset data 15 from selected assets 54, and (u) creating common operating picture 32 based on steps (l)-(t).

Referring now primarily to FIG. 5, method 300 for aggregating and displaying asset information to create common operating picture 32 for coordinating and controlling a response to an event 23 can include, but is not limited to including the steps of (a) collecting 301 information to show asset conditions 39 based on actual field conditions (b) simulating 303 possible developments in event 23 by feeding (ii) asset conditions 39 based on the actual field conditions, (ii) assets 53, (iii) asset dependencies 73, (iv) asset vulnerabilities 75, and (v) asset behaviors to analytical tools 77 and executing analytical tools 77 to compute results 83, (c) allowing 305 the user to toggle back and forth between actual and simulated asset conditions 39, (d) anticipating 307 at least one impact if asset condition 39 changes due to event 23 based on results 83, (e) updating 309 asset vulnerabilities 75 and asset dependencies 73 based on results 83 and the at least one impact, (f) repeating 311 steps (a) through (e) to create common operating picture 32 for managing event 23, and (g) coordinating and controlling 313 a response to event 23 based on the updated asset vulnerabilities and the updated asset dependencies. The step of coordinating and controlling 313 can include the step of deploying and tracking assets 53 based on location information 43 received from location receiver 92 and the response to event 23.

Method 300 can optionally include the steps of identifying region 19 impacted by event 23, displaying region display 34 and asset data 15 including assets 53, assent dependencies 73, and asset vulnerabilities 75, updating asset data 15 to form updated assets 55, and storing updated assets 55 on computer-readable medium 26. Method 300 can also optionally include as the steps of determining, for region 19, imagery 27 and other data 29A, for example, three-dimensional data, for base canvas 27A upon which selected data layers can be overlaid, acquiring imagery 27 and other data 29A to make base canvas 27A geospatially accurate, selecting assets 53 required to respond to event 23, identifying selected assets 54 equipped with global positioning system (GPS) transponders, for each of the selected GPS enabled assets, identifying location receiver 92 that can provide location information 43, and associating each of the selected OPS enabled assets with geospatial information based on location information 43. Method 300 can also optionally include the steps of grouping assets 53 into asset types 37A, associating graphical representation 33 with each asset type 37A, locating graphical representations 33 of the selected GPS enabled assets on base canvas 27A according to the geospatial information, identifying sources of data 29A for each of the selected GPS enabled assets, adding data geospatial information to the data 29A, associating the data 29A with graphical representation 33 according to the data geospatial information and the geospatial information, enabling manipulation of base canvas 27A, and enabling selective display of data layers 31 and assets 53. Method 300 can further optionally include the steps of enabling querying of asset 53 to display the data 29A, aggregating and displaying the data 29A associated with asset 53, updating the data 29A and the geospatial information in real time, resolving conflicts between data layers 31 using automated methods, identifying external data feeds and associating the external data feeds with assets 53, linking external analysis applications to assets 53, identifying asset dependencies 73, asset vulnerabilities 75, and asset behaviors, creating dependency information from asset dependencies 73, storing the dependency information on computer-readable medium 26, and implementing analysis tools 77 associated with data layers 31.

Referring primarily to FIGS. 1, 2, 3A-3B, 4A-4B, and 5, methods 200, 250, and 300 and systems 100 and 150 can be used operationally to prepare for an unexpected event by facilitating the steps of (a) identifying the geographic region of interest, (b) determining what kind of imagery 27 and data 29A would best serve as a base canvas 27A upon which selected data layers 31 can be overlaid (for example, two dimensional low resolution graphics, three dimensional high resolution graphics, maps, charts, etc.), (c) acquiring imagery 27 and data 29A to prepare a geospatially accurate base canvas 27, (d) identifying assets 53 required to accomplish the mission (for example, office buildings, fire stations, and railroads), (e) for each asset type 37A required, identifying location receiver 92 that can provide live information (for example, cameras and GPS locators), (f) creating data layer 31 for each asset type 37A with assets 53 identified by graphical representations 33, the locations of which align correctly with base canvas 27A, and (g) identifying sources of data 29A for each asset 53. The asset data 15 might already exist in geospatial format; for example, there may be a data base with the location of fire stations, and another with emergency equipment that may correspond to the same physical building, or in multiple conventional data bases, for example, building square footage may be contained in municipality tax records. Further steps facilitated by system 100 can include (h) in the case of non-geospatially oriented data, adding geospatial information to the data 29A so it can be referenced by clicking graphical representation 33 in data layer 31, (i) providing the capability to select base canvas 27A and manipulate it, for example, zooming in and out, and rotating) using intuitive hand gestures, (j) displaying multiple data sources in a common environment by allowing the selection of which assets 53 and data layers 31 are displayed, (k) allowing users to query an asset 53 by selecting it and summoning data from displayed and selected but not displayed data layers 31, and external data sources, and (l) aggregating and displaying data 29A concerning asset 53 such as, for example, asset data 15 and asset information 49 from displayed and selected data layers 31. The system can mark and/or highlight assets 53 that have changed according to the date of change and/or asset condition 39 that changed. Still further steps facilitated by system 100 can include (m) conducting an internet search to ascertain if more current asset data 15 is available, (n) using fuzzy logic to resolve conflicts between data layers 31, for example, inconsistent phone numbers, (o) identifying external data feeds providing additional information that is useful in performing analyses such as, for example, weather and traffic conditions, (p) adding external data feeds to a list of data layers 31 accessible to the user, (q) identifying analytical tools 77 that are useful in performing analyses, for example, plume dispersal models and blast damage models, (r) linking external analysis applications so that required inputs are supplied from AIMS 45 and results are fed back to AIMS 45, (s) identifying asset dependencies 73 and asset vulnerabilities 75 for example, services required for operation such as electricity and water, and conditions that prevent operation such as, for example, a flood above eight inches or wind speed greater than fifty mph, (t) recording model-specific dependency/vulnerability data and storing dependency information for future use, and (u) implementing analysis tools 77 as data layers 31 that utilize and interact with AIMS 45, for example, creating interdependency models and performing simulations.

Referring primarily to FIGS. 3A-3B, 4A-4B and 5, methods 250 (FIGS. 3A-3B), 200 (FIGS. 4A-4B), and 300 (FIG. 5) of the present embodiment can be, in whole or in part, implemented electronically.

Herein, various functions, functionalities and/or operations may be described as being performed by or caused by software program code to simplify description or to provide an example. However, those skilled in the art will recognize what is meant by such expressions is that the functions result from execution of the program code/instructions by a computing device as described above, e.g., including a processor, such as a microprocessor, microcontroller, logic circuit or the like.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

Although these teachings have been described with respect to various embodiments, it should be realized these teachings are also capable of a wide variety of further and other embodiments within the spirit and scope of the appended claims.

What is claimed is:

1. A computer implemented method for organizing and presenting in a single display, using temporal and locational relationships, information related to an event, the method comprising:
   (a) determining location information associated with the event;

(b) creating, using a computer, a base canvas using at least one data feed and the location information; wherein the base canvas includes imagery and at least one data layer which is overlaid upon the base canvas and which is correlated and geospatially aligned with the imagery according to the location information;

(c) creating and storing an event file, the event file including alerts derived by event driven simulation of behavior of assets, by:
identifying source material relevant to the event;
embodying the source material in one or more electronic files;
storing the one or more electronic files in a database;
associating the database with the at least one data layer by a data feed;
associating with each of the one or more electronic files a date, a begin time and an end time, a location and an icon;
creating a single electronic file relating to the event;
creating one or more identified sub-files in the single event file; and
associating each of the one or more electronic files embodying the source material with one of the identified sub-files in the single event file; and (d) displaying a graphical user interface component and at least a portion of the imagery associated with the event on a display device, the graphical user interface component comprising components that include a timeline and a slider component sliding on said timeline; said timeline configured to identify a period of time with which is associated predetermined source material embodied in predetermined electronic files associated with predetermined sub-files selected for engagement by said components; said slider component configured to identify a time interval in said timeline, to display at least one of the icons associated with an electronic file and to identify in a list of electronic files contained in a selected sub-file constituting part of the display at least one predetermined electronic file to which such icon is linked; the icons and identified electronic file configured to display the predetermined source material; the predetermined source material and the predetermined electronic files being the source material and the predetermined electronic files associated with the time interval; wherein the location associated with each displayed icon is also displayed;

wherein execution of the method is caused by computer readable code executing in the computer; and wherein said computer readable code is embodied in non-transitory computer usable media and executed by one or more processors.

2. The computer implemented method of claim 1 further comprising:
selecting sub-files to be engaged by the timeline and the slider component; and
manipulating the slider component to display the icons and highlight listed electronic files associated with intervals of time identified by the slider component.

3. The computer implemented method of claim 1 wherein the event is an anticipated future occurrence.

4. The computer implemented method of claim 1 wherein an icon or a highlighted electronic file listed in an engaged sub-file linked to at least one electronic file for the source material comprising a video clip is displayed.

5. The computer implemented method of claim 4 further comprising synchronizing temporal display of events shown in the video clip with a position of the slider component.

6. The computer implemented method of claim 1 further comprising:
modifying input of the source material to the Event File; and
obtaining new results when changing a position of the slider component on the timeline.

7. The computer implemented method of claim 1 further comprising maintaining an audit log of all changes made to the Event File.

8. The computer implemented method of claim 1 wherein the at least one data layer includes a link to the source material associated with the event; a predetermined geospatial location and period of time of occurrence being associated with the source material; the source material being stored in sub-files associated with a single event file; the predetermined geospatial locations and periods of time of occurrence also being associated with the sub-files; and
wherein the event file is created and stored by:
(a) identifying, using the computer, assets associated with the location information, each of the assets being characterized by asset vulnerabilities, asset dependencies, asset behavior, asset type, and asset conditions; assets comprising physical entities without using critical decision points (CDPs), CDPs being identified moments where a decision has greater potential to affect an outcome; wherein said asset dependencies, asset behavior comprise required inputs and outputs produced;
(b) associating, using the computer, the assets with the at least one data layer;
(c) aggregating, using the computer, data from the at least one data feed associated with the assets while a user is interfacing with the at least one data layer;
(d) identifying, using the computer, the asset dependencies, the asset vulnerabilities, and the asset behavior associated with the assets;
(e) selecting, using the computer, the assets associated with the event;
(f) changing, using the computer, asset condition based on the asset dependencies, the asset vulnerabilities, and the asset behaviors;
(g) simulating, using the computer, the event based on selected assets, the location information, asset condition, the base canvas, the at least one data layer, the asset vulnerabilities, the asset dependencies, and the asset behaviors; the simulating being performed by the event driven simulation;
(h) continuously updating, using the computer, the asset condition based on the asset vulnerabilities, the asset dependencies, and the asset behaviors; and
(i) continuously updating, using the computer, the at least one data layer with information from the at least one data feed.

9. A system for organizing and representing in a single display, using temporal and locational relationships, information related to an event, the system comprising:
at least one processor;
a display component; and
at least one computer usable media having computer readable code embodied therein, the computer readable code, when executed in the at least one processor, causing the at least one processor to:
determine location information associated with the event;
create a base canvas using at least one data feed and the location information; wherein the base canvas includes imagery and at least one data layer which is overlaid upon the base canvas and which is correlated and geospatially aligned with the imagery according to the location information;

create and store an event file, the event file including alerts derived by event driven simulation of behavior of assets, by:
- identifying source material relevant to the event;
- embodying the source material in one or more electronic files;
- storing the one or more electronic files in a database;
- associating the database with the at least one data layer by a data feed;
- associating with each of the one or more electronic files a date, a begin time and an end time, a location and an icon;
- creating a single electronic file relating to the event;
- creating one or more identified sub-files in the single event file; and
- associating each of the one or more electronic files embodying the source material with one of the identified sub-files in the single event file; and display a graphical user interface component and at least a portion of the imagery associated with the event on a display device, the graphical user interface component comprising components that include a timeline and a slider component sliding on said timeline; said timeline configured to identify a period of time with which is associated predetermined source material embodied in predetermined electronic files associated with predetermined sub-files selected for engagement by said components; said slider component configured to identify a time interval in said timeline, to display at least one of the icons associated with an electronic file and to identify in a list of electronic files contained in a selected sub-file constituting part of the display the at least one predetermined electronic file to which such icon is linked; the icons and identified electronic file configured to display the predetermined source material; the predetermined source material and the predetermined electronic files being the source material and the predetermined electronic files associated with the time interval; wherein the location associated with each displayed icon is also displayed.

10. The system of claim 9 wherein the computer readable code further causes the at least one processor to:
- select sub-files to be engaged by the timeline and slider component; and
- manipulate the slider component to display the icons and highlight listed electronic files associated with intervals of time identified by the slider component.

11. The system of claim 10 wherein the display component comprises a display component in a tablet computing component.

12. The system of claim 9 wherein the computer readable code further causes the at least one processor to select a location of interest for the display.

13. The system of claim 12 wherein location of interest comprises an area.

14. The system of claim 12 wherein the event is a possible future occurrence, including a possible future occurrence of an uncertain nature.

15. The system of claim 9 wherein at least one video clip is displayed.

16. The system of claim 15 wherein the computer readable code further causes the at least one processor to synchronize temporal display of events shown in the video clip with a position of the slider component.

17. The system of claim 9 wherein the computer readable code further causes the at least one processor to:
- modify input of the source material to the Event File; and
- obtain new results when changing a position of the slider component on the timeline.

18. The system of claim 9 wherein the computer readable code further causes the at least one processor to maintain an audit log of all changes made to the Event File.

19. The system of claim 9 wherein the at least one data layer includes the source material associated with the event; a predetermined geospatial location and period of time of occurrence being associated with the source material; the source material being stored in sub-files; the predetermined geospatial location and period of time of occurrence also being associated with the sub-files; and wherein the event file is created and stored by:

(a) identifying assets associated with the location information, each of the assets being characterized by asset vulnerabilities, asset dependencies, asset behavior, asset type, and asset conditions; assets comprising physical entities without using critical decision points (CDPs), CDPs being identified moments where a decision has greater potential to affect an outcome; wherein said asset dependencies, asset behavior comprise required inputs and outputs produced, (b) associating the assets with the at least one data layer;

(c) aggregating data from the at least one data feed associated with the assets while a user is interfacing with the at least one data layer;

(d) identifying the asset dependencies, the asset vulnerabilities, and the asset behavior associated with the assets;

(e) selecting the assets associated with the event;

(f) changing asset condition based on the asset dependencies, the asset vulnerabilities, and the asset behaviors;

(g) simulating, the event based on selected assets, the location information, the asset condition, the base canvas, the at least one data layer, the asset vulnerabilities, the asset dependencies, and the asset behaviors; the simulating being performed by the event driven simulation;

(h) continuously updating the asset condition based on the asset vulnerabilities, the asset dependencies, and the asset behaviors; and (i) continuously updating the at least one data layer with information from the at least one data feed.

* * * * *